United States Patent
Colak et al.

(10) Patent No.: US 8,711,526 B2
(45) Date of Patent: Apr. 29, 2014

(54) MAGNETIC ELEMENT WITH TOP SHIELD COUPLED SIDE SHIELD LAMINATION

(75) Inventors: Levent Colak, Eden Prairie, MN (US); Mark William Covington, Edina, MN (US); Dimitar Velikov Dimitrov, Edina, MN (US); Mark Thomas Kief, Lakeville, MN (US); Anthony Mack, Minneapolis, MN (US); Dian Song, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/538,943

(22) Filed: Jun. 29, 2012

(65) Prior Publication Data

US 2014/0004385 A1 Jan. 2, 2014

(51) Int. Cl.
*G11B 5/127* (2006.01)

(52) U.S. Cl.
USPC .......................................... 360/319; 360/324

(58) Field of Classification Search
USPC ..................................... 360/324.12, 324, 319
See application file for complete search history.

(56) References Cited

U.S. PATENT DOCUMENTS

| | | | |
|---|---|---|---|
| 6,266,218 B1 * | 7/2001 | Carey et al. ............... | 360/324.12 |
| 6,667,862 B2 * | 12/2003 | Zhu ......................... | 360/324.12 |
| 6,903,906 B2 * | 6/2005 | Morinaga et al. ........ | 360/324.12 |
| 6,967,823 B2 * | 11/2005 | Nakamoto et al. ............ | 360/319 |
| 7,295,401 B2 * | 11/2007 | Jayasekara et al. ...... | 360/125.08 |
| 7,446,979 B2 * | 11/2008 | Jayasekara ................... | 360/319 |
| 7,599,151 B2 * | 10/2009 | Hatatani et al. ............... | 360/319 |
| 8,085,500 B2 | 12/2011 | Yazawa et al. | |
| 2009/0166184 A1 | 7/2009 | Zhou et al. | |
| 2011/0279923 A1 | 11/2011 | Miyauchi et al. | |

\* cited by examiner

*Primary Examiner* — Brian Miller
*Assistant Examiner* — Carlos E Garcia
(74) *Attorney, Agent, or Firm* — Hall Estill Attorneys at Law

(57) ABSTRACT

A magnetic element is generally provided that can be implemented as a transducing head. Various embodiments may configure a magnetic stack to be separated from a side shield lamination on an air bearing surface (ABS). The side shield lamination can be constructed to have a plurality of magnetic and non-magnetic layers each coupled to a top shield.

20 Claims, 5 Drawing Sheets

MAGNETIC ELEMENT WITH TOP SHIELD COUPLED SIDE SHIELD LAMINATION

SUMMARY

Various embodiments are generally directed to a magnetic element capable of at least magnetic reading.

In accordance with various embodiments, a magnetic stack may be separated from a side shield lamination on an air bearing surface (ABS). The side shield lamination can be constructed to have a plurality of magnetic and non-magnetic layers each coupled to a top shield.

DETAILED DESCRIPTION

Industry has diligently advanced towards data storage devices exhibiting higher data bit density and faster data transfer rates. Such performance can correspond with reduction in the physical and magnetic size of various data reading and writing components, such as data tracks and transducing heads. Existing data sensors may be magnetically scaled down with the addition of side shield to allow data access from reduced width data tracks. However, side shields can introduce instability and noise to the data sensor while being susceptible to process and design variability. Hence, a magnetic data sensor configured with side shields that are magnetically stable and do not inject noise is a continued demand of the industry.

Accordingly, a magnetic element can be configured with a magnetic stack that is separated from a side shield lamination on an air bearing surface (ABS) and constructed with a plurality of magnetic and non-magnetic layers each coupled to a top shield. The use of a side shield lamination with sub-layers each coupled to the top shield minimizes cross-track magnetic fields by providing flux closure without introducing magnetic charge development proximal the magnetic sensing stack. Such reduced cross-track fields can increase data bit resolution for the magnetic element while providing heightened data access accuracy in high data bit density and reduced form factor data storage devices.

Figure 1:
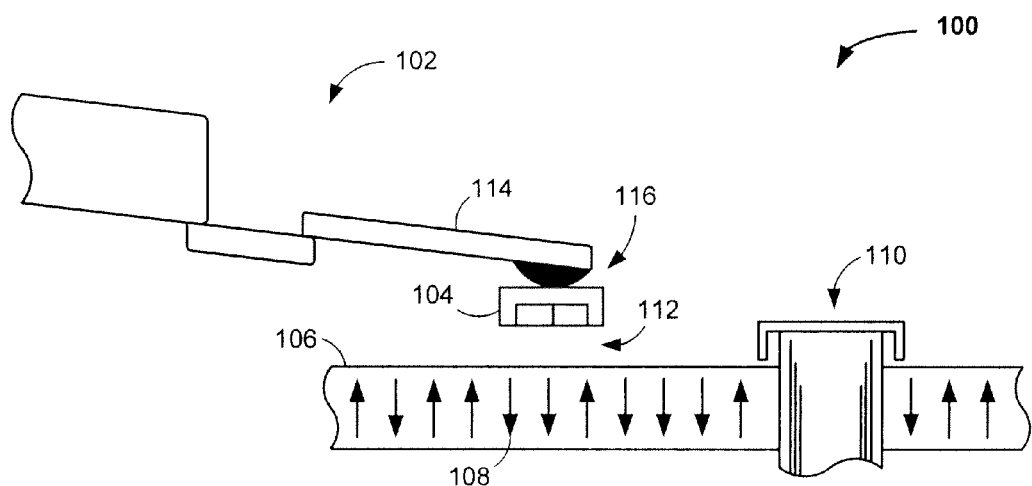
FIG. 1 is a block representation of an exemplary portion of a data storage device.

An example data transducing portion 100 of a data storage device that can utilize top shield coupled side shield laminations is generally provided in FIG. 1. The transducing portion 100 has an actuating assembly 102 that positions a transducing head 104 over a magnetic storage media 106 that is capable of storing programmed bits 108. The storage media 106 is attached to a spindle motor 110 that rotates during use to produce an air bearing surface (ABS) 112 on which a slider portion 114 of the actuating assembly 102 flies to position a head gimbal assembly (HGA) 116, which includes the transducing head 104, over a desired portion of the media 106.

The transducing head 104 can include one or more transducing elements, such as a magnetic writer and magnetically responsive reader, which operate to program and read data from the storage media 106, respectively. In this way, controlled motion of the actuating assembly 102 causes the transducers to align with tracks (not shown) defined on the storage media surfaces to write, read, and rewrite data.

It should be noted that the term "stack" is an unlimited term within this disclosure that can be one or more layers, constructed of magnetic and non-magnetic material, and capable of magnetic reading and writing. Throughout the present application, the term "stack" will be understood to mean a component that is constructed to provide access to external data bits in any operational environment. For example, but not in any way limiting, a magnetic stack may be a data read or write configuration that can differentiate between a plurality of data bits.

Figure 2:
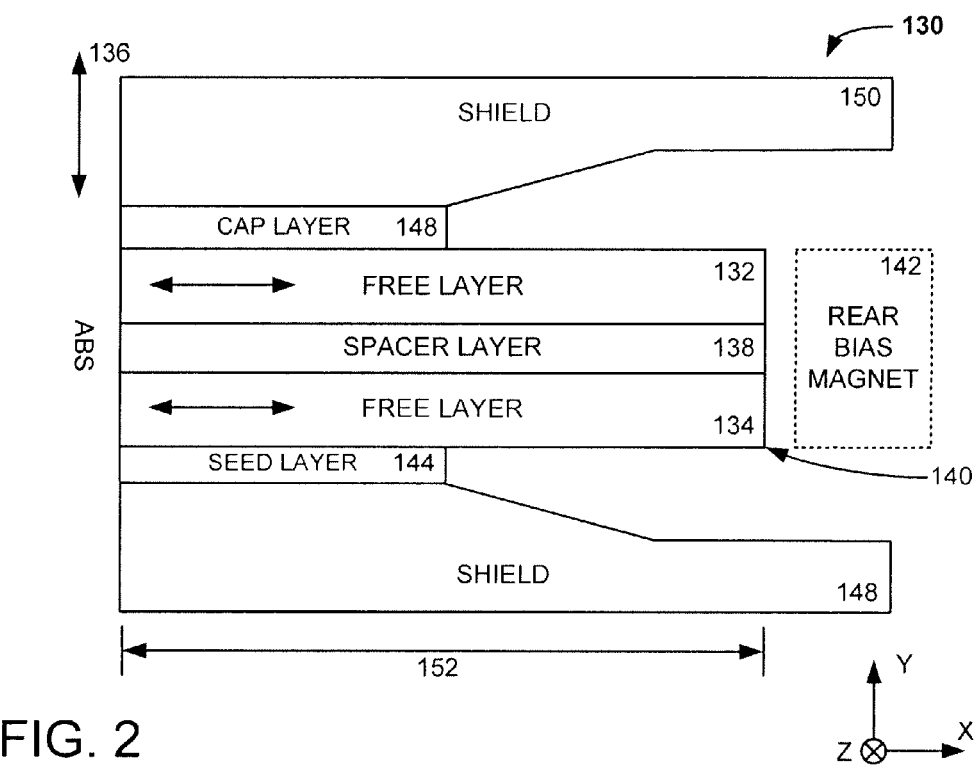
FIG. 2 provides a cross-section block representation of an example magnetic element capable of being used in the data storage device of FIG. 1.

FIG. 2 displays a cross-section block representation of example magnetic element 130 capable of being used in the data storage device 100 of FIG. 1. The element 130 has first and second ferromagnetic free layers 132 and 134 that are each bipolar and sensitive to external magnetic fields. That is, each free layer 132 and 134 can magnetically rotate in response to an encountered external magnetic field, such as programmed magnetic bits on data tracks 136 of an adjacent data storage medium that is separated from the free layers 132 and 134 by an air bearing surface (ABS). The relative angle between free layer 132 and 134 can be tuned to provide a relative margin, which will translate to low or high resistance/voltage states and data bit logical states.

The free layers 132 and 134 are each contactingly adjacent a non-magnetic spacer layer 138 that acts to provide a measureable magnetoresistive effect between layers 132 and 134. While the spacer layer 138 can be constructed of any non-magnetic material with a predetermined thickness, a variety of different non-limiting configurations can be used to accommodate varying free layer magnetic interactions and data bit sensing. The coupled lamination of the free layers 132 and 134 to the spacer layer 138 can be characterized as a magnetic stack 140 that is influenced, in some embodiments, by a rear mounted bias magnet 142 that imparts a predetermined magnetic biasing field on the free layers 132 and 134 to set a default magnetization.

The magnetic stack 140 can further be constructed where each of the free layers 132 and 134 are additionally coupled to a respective electrode layer, such as seed layer 144 and cap layer 146 that provide appropriate growth template (seed) or protection (cap) during stack definition process. It is contemplated, however, that the magnetic element 130 is constructed without the electrode layers while in other embodiments the composition, shape, and placement of the electrode layers 144 and 146 are modified, as needed, to provide performance and manufacturing benefits, such as enlarging the width or length one, or both, layers 144 and 146.

While encountering the data bits along a particular data track 136, data bits from adjacent tracks can inadvertently be sensed by the magnetic stack 140. At least one shield layer can therefore be attached to each of the electrode layers 144 and 146 to reduce the magnetic width of the stack 140 and minimize such inadvertent data bit sensing. The shield layers 148 and 150 can be oriented in a variety of formations and compositions, none of which are required or limited, to direct unwanted magnetic flux away from the free layers 132 and 134.

Magnetic stability of the stack 140 can be increased with the elongation of the stack's stripe height 152, as measured along the X axis. The shielding of the magnetic stack 140 can be supplemented with other shield layers, such as side shields, that may or may not combine with shield layers 148 and 150 to allow for improved magnetic sensing of programmed data bits from the preset data tracks 136 by eliminating noise and inadvertent sensing of adjacent bits. The size and configuration of the shielding layers, particularly the side shields, can influence the magnetization accuracy and width of the magnetic element 130, which can be stressed in high data bit density recordings with reduced data track widths.

Figure 3:
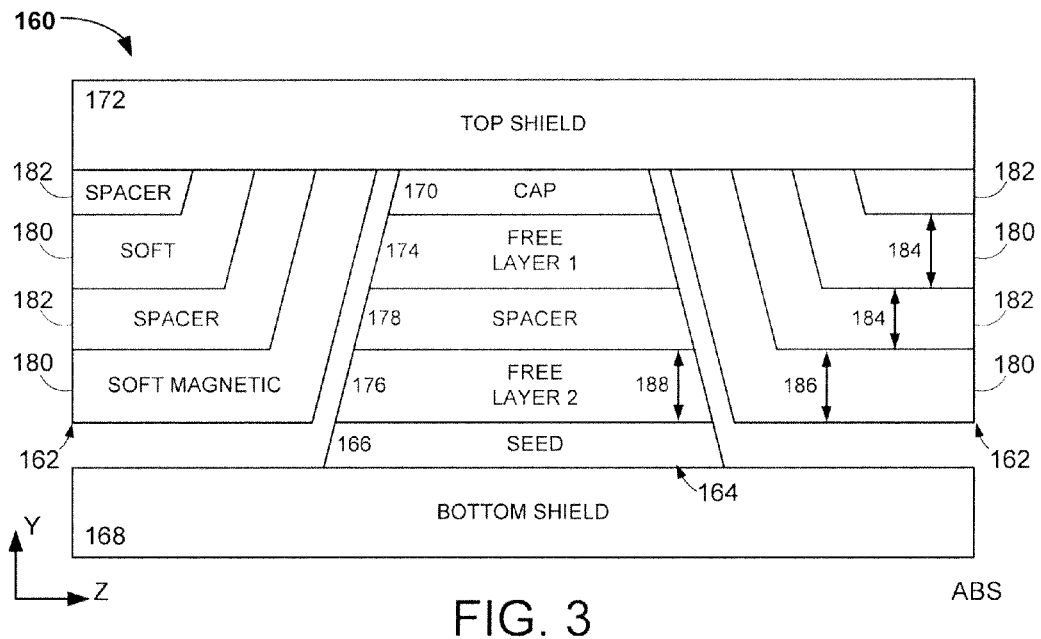
FIG. 3 shows a block representation of a portion of an example magnetic element constructed in accordance with various embodiments.

While the use of side shields may provide the physical width of the magnetic element 130, the configuration and construction of the side shields can pose a considerable challenge to the reduction in cross-track magnetic fields that impact quiescent magnetic bias and increase noise. FIG. 3 displays a cross-track block representation of an example magnetic element 160 configured with side shield laminations 162 tuned to increase magnetic stack 164 performance without introducing noise and magnetic instability.

As shown in FIG. 3, the magnetic stack 164 is configured in a substantially trapezoidal shape on the ABS with a seed layer 166 having a larger width, along the Z axis, at the bottom shield 168 than a cap layer 170 at the top shield 172. While the trapezoidal shape is by no means required or limiting to the possible configurations of the magnetic stack 164, the trapezoidal shape can provide tuned magnetic performance by having different widths of the magnetically free layers 174 and 176 that are separated by a non-magnetic spacer 178. One or both side shield laminations 162 can be configured to substantially match the sidewall shape of the magnetic stack 164 to provide a continuous common separation distance from the magnetic stack 164 from the seed layer 166 to the cap layer 170.

Each side shield lamination 162 is designed and constructed of alternating sub-layers 180 and 182 of soft magnetic and non-magnetic materials. Various embodiments can exclusively use alternating ferromagnetic sub-layers for one or both side shields, but the lack of non-magnetic materials can lead to an uncontrolled net cross-track, along the Z axis, magnetic field that may detrimentally impact quiescent state biasing, such as asymmetry, and produce noise as the field fluctuates. In the embodiment shown in FIG. 3, the alternating use of low coercivity ferromagnetic sub-layers 180 separated by non-magnetic spacer sub-layers 182 can minimize the generation of magnetic charge in the side shield laminations 162 and cross-track magnetic fields for the magnetic element 160.

The laminated structure of the side shield laminations 162 is tuned to block magnetic flux from reaching the magnetic stack 164 during operation by forcing the flux to remain parallel to the free layers 174 and 176 before being directed to flux closure in the top shield 172. The orientation of the various sub-layers 180 and 182 with continuous spacer and soft thicknesses 184 and 186 that are respectively shaped to provide a continuous ferromagnetic sidewall facing the magnetic stack 164 can efficiently guide magnetic flux to the top shield 172 without coupling to either of the magnetically free layers 174 and 176.

Flux shielding can further be tuned by constructing one or more non-magnetic spacer sub-layers 182 of material that breaks exchange coupling or establishes RKKY coupling between the soft magnetic sub-layers 180. Such non-magnetic spacer sub-layer 182 configurations can be tuned at least for spacer thickness 184, as measured along the Y axis, in response to soft and free thicknesses 186 and 188. That is, the thicknesses 184 and 186 and materials of the magnetic and non-magnetic sub-layers 180 and 182 can be tuned to match or be dissimilar from the thicknesses and materials of the side shields 162 and magnetic stack 164 to provide predetermined magnetic behavior, such as balanced or unbalanced magnetic moments, resulting in at least flux closure as the magnetic flux enters the top shield 172.

Figure 4:
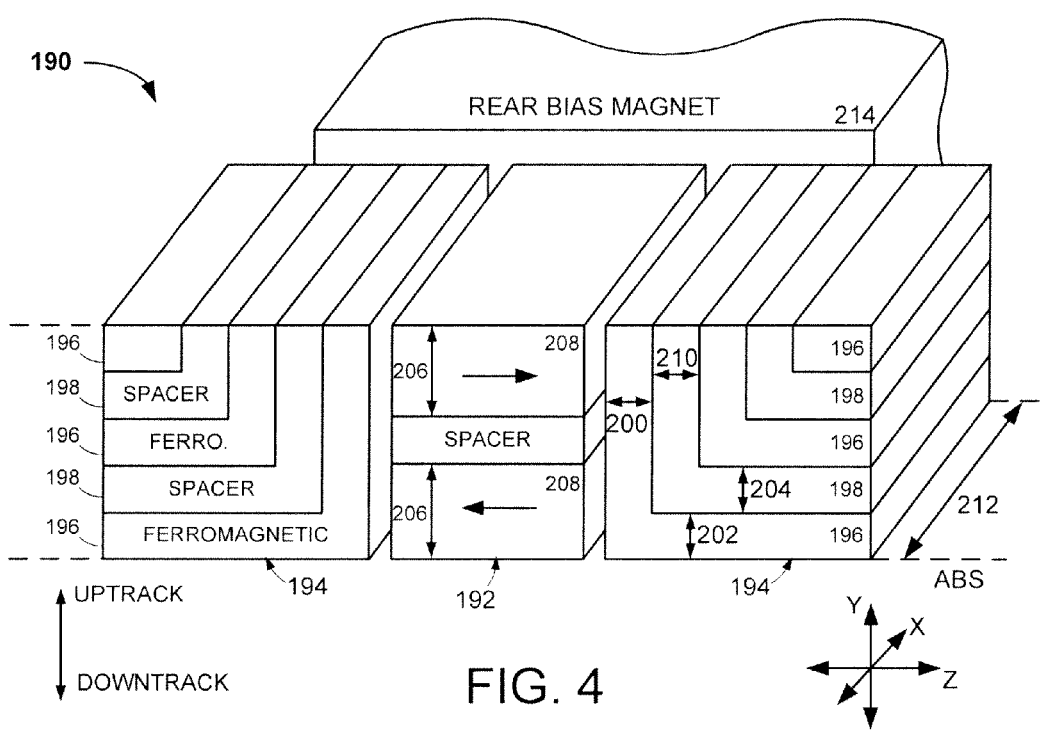
FIG. 4 displays an isometric block representation of a portion of an example magnetic element.

FIG. 4 generally illustrates an isometric block representation of portions of an example magnetic element 190 configured with a substantially rectangular shaped magnetic stack 192 that is electrically and magnetically isolated from adjacent side shield laminations 194 on the ABS. Each side shield lamination 194 has ferromagnetic sub-layers 196 separated by non-magnetic spacer sub-layers 198. As shown, each sub-layer 196 and 198 is shaped to provide a continuous sidewall thickness 200 facing the magnetic stack 192. That is, each sub-layer 196 and 198 is configured with an "L" shape defined by sidewall thicknesses 200 that continuously extend from a horizontal portion, measured along the Z axis, to a vertical portion, along the Y axis, that continuously extends the horizontal portion to the top of the side shield.

The continuous vertical portion of each side shield lamination sub-layer 196 and 198 can allow efficient flow of magnetic flux to the top shield while minimizing generation of magnetic charge proximal to the magnetic stack 192 due to the lack of any sub-layer boundary present on the sidewall of the side shield lamination 194 facing the magnetic stack 192. Configuring the side shield sub-layers 196 and 198 with respective first and second thicknesses 202 and 204 that are less than the free thicknesses 206 of one or both magnetic free layers 208 of the magnetic stack 192 can allow antiferromagnetic alignment of magnetic flux in the sub-layers 196 and 198 that may contribute to minimizing cross-track magnetic fields and flux closure through a top shield.

In some embodiments, the first and second thicknesses 202 and 204 can vary from the horizontal portion to a vertical thickness 210 that is smaller or larger. Such varying thickness can further be tuned to differ in relation to proximity to the ABS along the stripe height 212. That is, the sub-layers 196 and 198 can be tuned with thicknesses 204 and 210 that are the same, or differ, on the ABS or distal to the ABS towards the rear bias magnet 214. The tuned thicknesses, such as reduced thicknesses distal to the ABS, can allow for predetermined magnetic flux behavior in the side shields 194, which may include predetermined interaction between the bias magnetization provided by the rear bias magnet 214 and the magnetic flux of the side shields 194.

Figure 5:
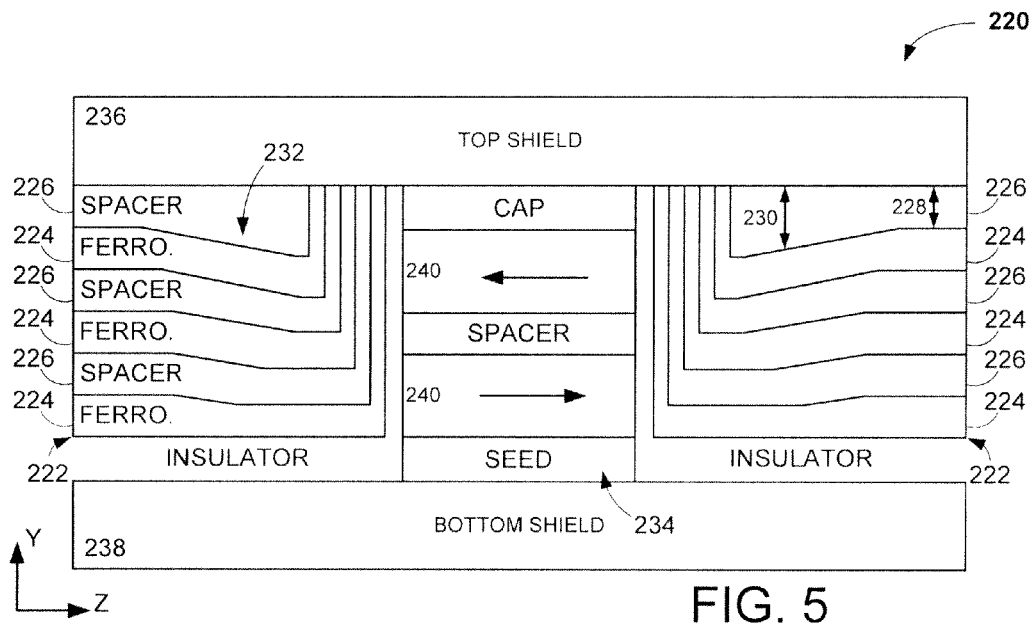
FIG. 5 illustrates an ABS block representation of a portion of an example magnetic element constructed in accordance with various embodiments.

FIG. 5 displays an ABS view of a block representation of a portion of an example magnetic element 220 with side shield laminations 222 configured with shaped sub-layers 224 and 226 that each have varying thicknesses 228 and 230 on the ABS. As shown, the horizontal portion of each sub-layer 224 and 226 has a transition region 232 that can enlarge or shrink the first thickness 228, distal to the magnetic stack 234, to the second thickness 230, proximal the magnetic stack 234.

The construction of the transition region 232 can be done in a variety of different manners, such as differing deposition means, that may result in vertical sidewall portions of one or more sub-layers 224 and 226 having a reduced thickness compared to the first and second thicknesses 228 and 230. In other words, different deposition techniques, like oblique sputtering and atomic layer deposition, are used to respectively form the magnetic and non-magnetic sub-layers 224 and 226. While the use of more than one deposition means is not required or limiting, such practice can increase uniformity of the sidewall portions of the magnetic sub-layers 224.

With the shaped side shield sub-layers 224 and 226, the magnetic performance of the magnetic element 220 can be tuned by controlling the manner in which magnetic flux flows through the side shield laminations 222 to the top or bottom shields 236 and 238. As shown in FIGS. 3-5, various shapes can be used for the non-magnetic and/or magnetic sub-layers to tune antiferromagnetic coupling and magnetic flux flow while providing a continuous side shield sidewall facing the magnetic free layers 240 of the magnetic stack 234. The ability to tune the side shield laminations 222 can provide increased resistance to the generation of magnetic charge and other instabilities that are unable to withstand the presence of cross-track magnetic fields.

Figure 6A:
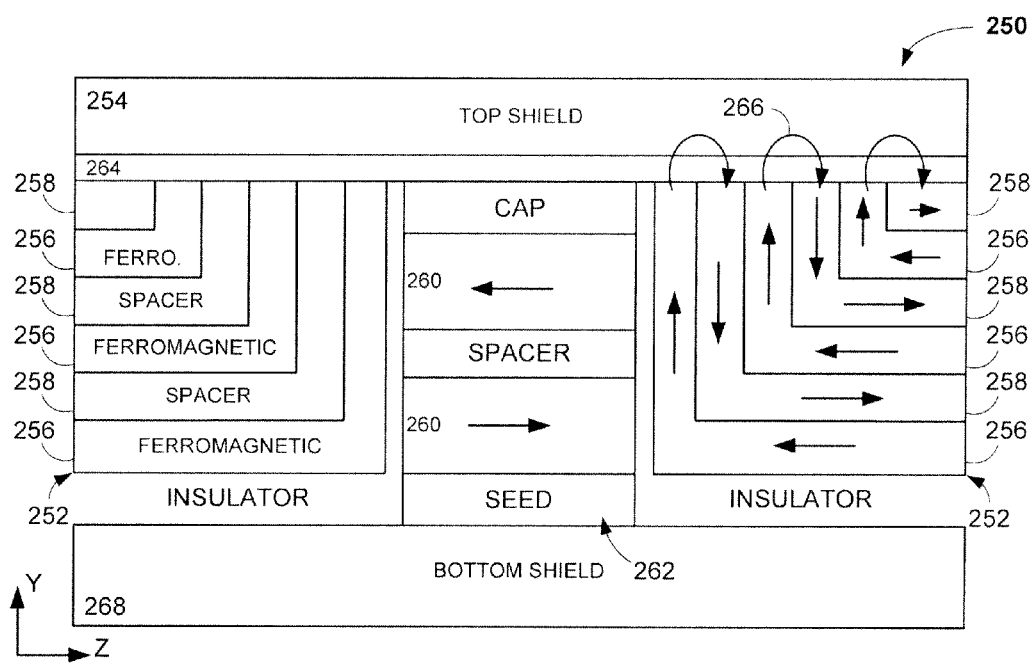
FIGS. 6A-6C respectively show ABS block representations of portions of an example magnetic element.
Figure 6B:
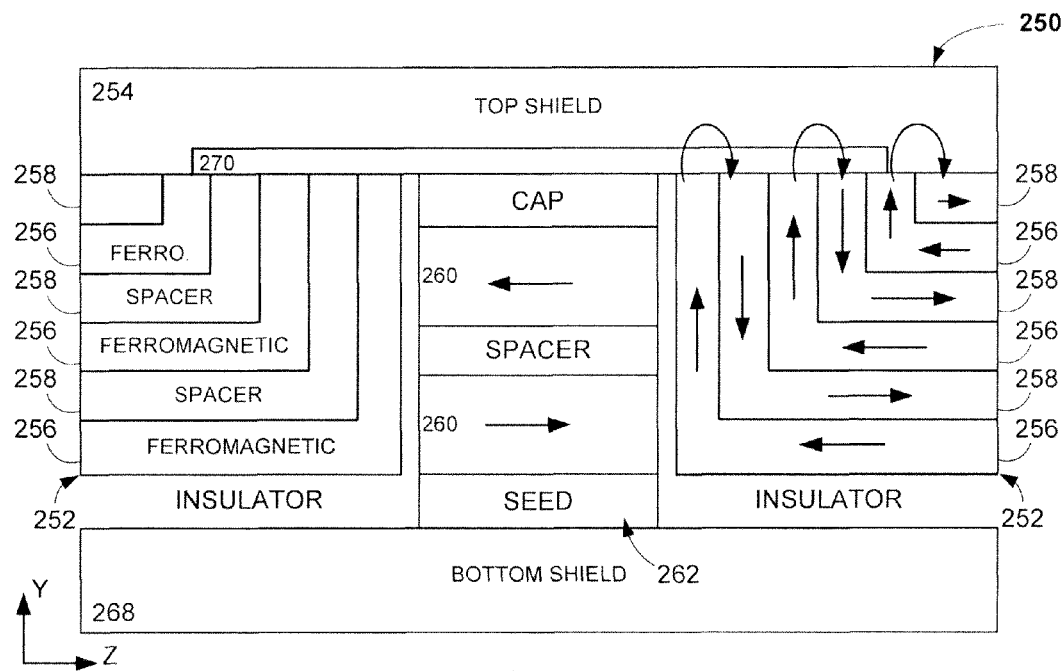
Figure 6C:
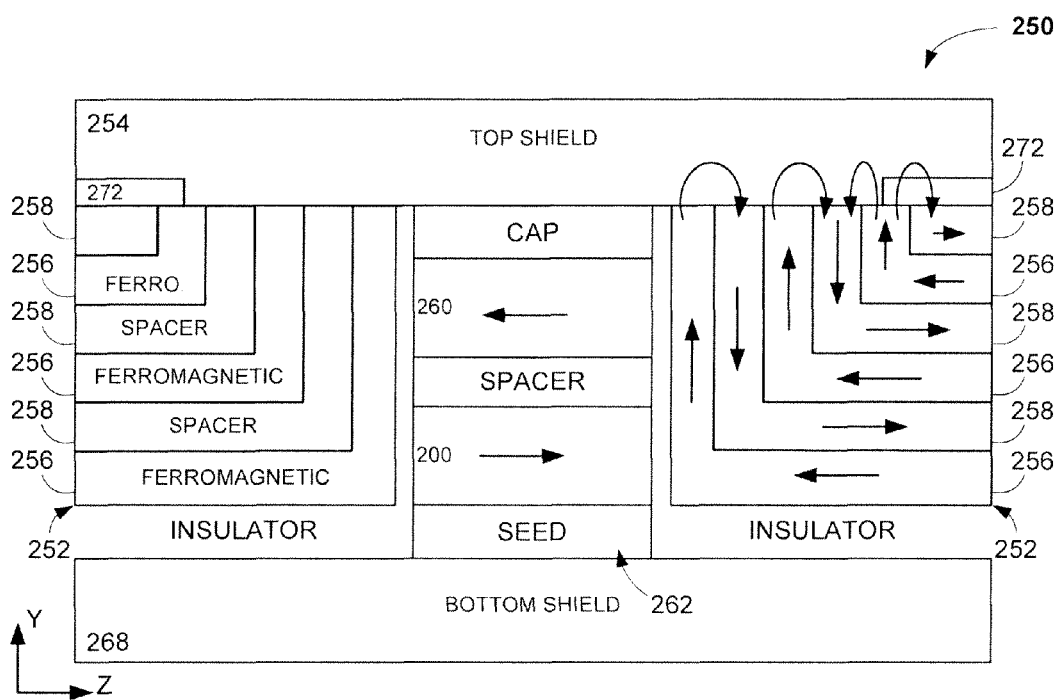

The ability to tune the sub-layers of the side shield laminations 222 can further provide robust flux closure by coupling each sub-layer 224 and 226 to the top shield 236. FIGS. 6A-6C generally illustrate block representations of a portion of an example magnetic element 250 exhibiting flux closure as magnetic flux passes through a side shield lamination 252 and top shield 254. It should be noted that the side shield lamination 252 has alternating shaped magnetic and non-magnetic sub-layers 256 and 258 that provide a continuous ferromagnetic sidewall proximal the magnetic layers 260 of the magnetic stack 262.

The tuned shape and thickness of the respective sub-layers 256 and 258 can maintain magnetic flux in a direction orthogonal to the magnetization of the stack free layers 260 in the vertical sidewalls of the side shield laminations 252 proximal to the magnetic stack 262, which can reduce the influence of the magnetic flux on the data accessing operation of the magnetic stack 262. The tuned thickness, material, and shape of the sub-layers 256 and 258 can further flow the magnetic flux efficiently to the top shield 254 by providing balanced or unbalanced magnetic moments.

While each side shield sub-layer 256 and 258 can be directly exchange coupled to the top shield 254 through contacting engagement, FIG. 6A provides an embodiment where a non-magnetic thin film 264 continually extends across the top shield 254 to contact both side shield laminations 252 and the magnetic stack 262 to break any exchange coupling between the sub-layers 256 and 258 and the top shield 254. The non-magnetic thin film 264 can be tuned for thickness and material to allow flux closure in the side shield laminations 252 while adding protection against coupling between the top shield 254 and magnetic stack 262.

In some embodiments, the side shield laminations 252 are coupled exclusively to the bottom shield 268 while an insulating material is disposed between the top shield 254 and the various sub-layers 256 and 258, which can allow a variety of manufacturing options conducive to minimal process and design variability. The unlimited configurations possible with the side shield sub-layers 256 and 258 and the non-magnetic thin film 264 can control the behavior of magnetic flux through the top shield 254 to provide flux closure. FIG. 6A displays how the magnetic element 250 can be configured to direct magnetic flux 266 from magnetic sub-layers 256 to non-magnetic sub-layers 258 to provide flux closure.

FIG. 6B illustrates flux closure in the example magnetic element 250 that is tuned with the implementation of a non-magnetic thin film 270 that concurrently couples and continuously extends between the side shield laminations 252 while having a width, as measured along the Z axis, that is less than the width of the top shield 254. The non-magnetic thin film 270 can be tuned for with to couple to any number of sub-layers 256 and 258 to break exchange coupling and produce flux closure. That is, the non-magnetic thin film 270 can be configured to continuously contact less than all the side shield sub-layers 256 and 258 so that exchange coupling can exist between the top shield 254 and the non-contacted sub-layers.

The ability to tune the non-magnetic thin film 270 while in contact with the magnetic stack 262 decouples the free layers 260 from the top shield 254 and allows for simple manufacturing of a single thin film. However, the flux closure can also be controlled by configuring a plurality of non-magnetic thin films 272 coupled to one or both side shield laminations 252 while not contacting the magnetic stack 262, as shown in FIG. 6C. The width and thickness of the respective non-magnetic thin films 272 can be independently or collectively tuned to couple to some, or all, of the side shield sub-layers 256 and 258 to control magnetic flux behavior and provide flux closure.

The tuned non-magnetic thin films 272, along with balanced magnetic moments defined by the thickness and material of the sub-layers 256 and 258, may induce magnetic flux to flow from a magnetic sub-layer 256 to multiple non-magnetic sub-layers 258 in opposite directions, as displayed in FIG. 6C. The position and width of the non-magnetic thin film 272 can provide control of the magnetic flux behavior in what direction magnetic flux flows and how many sub-layers receive the flux. As such, the top shield 254, non-magnetic thin film 272, and side shield sub-layers 256 and 258 can be tuned to provide flux closure in a variety of different manners, which can accommodate data access operations in a number of different data storage devices, particularly reduced form factor, high data bit density devices.

Figure 7:
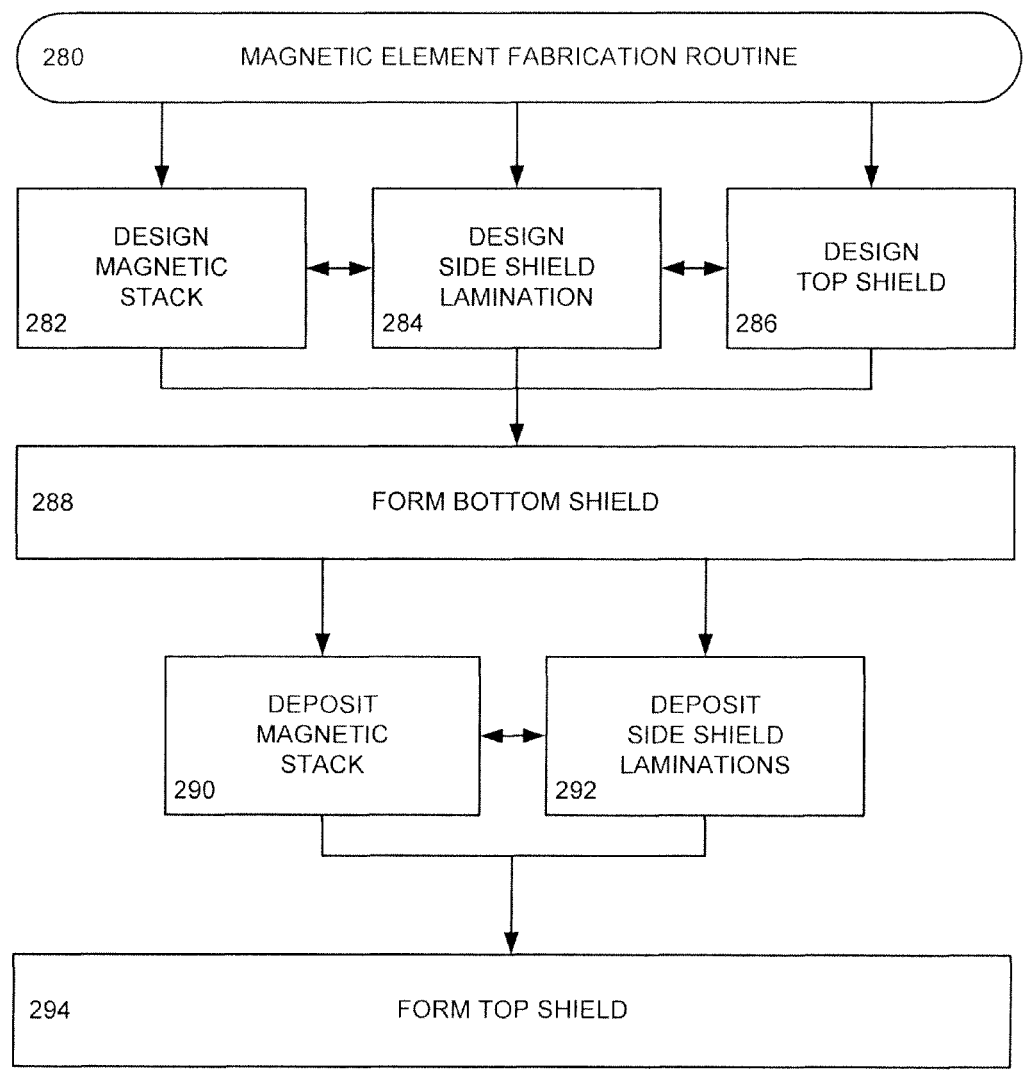
FIG. 7 provides a flowchart illustrating steps of an exemplary magnetic element fabrication routine conducted in accordance with various embodiments.

FIG. 7 provides an exemplary magnetic element fabrication routine 280 conducted in accordance with various embodiments to provide side shield laminations configured to provide flux closure through the top shield. The routine 280 can begin with any number of design steps that respectively configure at least the size, orientation, and magnetic behavior of the magnetic stack in step 282, the side shield laminations in step 284, and the top shield in step 286.

While the design of any of the magnetic element features in steps 282-286 can be conducted in any order, the construction of the magnetic element in some embodiments begins with the formation of a bottom shield in step 288. The design of the top shield in step 286 can include configuring the bottom shield with features, such as a non-magnetic thin film, that contributes to flux closure. Subsequent to the formation of the bottom shield in step 288, a magnetic stack and side shield laminations are formed respectively in steps 290 and 292. Various embodiments may construct portions of the magnetic stack and side shield laminations concurrently in a single lamination that is separated by subsequent processing, like forming isolation trenches between the stack and side shields.

The magnetic stack may be designed and formed is step 290 as a trilayer magnetic sensor defined by dual magnetically free layers and a lack of magnetically pinned reference layer. Such a trilayer design can combine the formation of a rear bias magnetic, such as the magnet 214 of FIG. 4, in step 290 to provide predetermined magnetization that can bias the magnetic stack and possibly the side shield laminations.

As discussed above, the side shield laminations formed in step 292 can comprise a plurality of alternating magnetic and non-magnetic sub-layers that are each shaped to have a continuous sidewall facing the magnetic stack and coupled to the top shield. The various side shield sub-layers constructed in step 292 can be independently or concurrently tuned for thickness and material to provide balanced or unbalanced moments that can contribute to the formation of flux closure and resistance to cross-track magnetic element instability.

Next in step 294, the routine 280 deposits a top shield in contact with the side shield laminations and magnetic stack. The top shield can be tuned to be a single layer or a lamination, such as with the inclusion of one or more non-magnetic thin films, configured to provide predetermined magnetic flux behavior in the side shields that is conducive to flux closure. Hence, the term "top shield" for the purposes herein means a magnetic shield and any thin films contained within the areal extent of the shield layer. That is, a "top shield" may be a shield positioned at the top or bottom of a magnetic stack and side shield laminations and constructed with one or more layers housed within a recess of the shield layer, regardless of whether the recess extends the entire width of the shield layer.

Through the routine 280, a high cross-track resolution magnetic element capable of increased data bit density applications can be constructed by tuning at least the side shield laminations and top shield. However, the routine 280 is not limited as the various steps can be omitted, changed, and added. For example, the side shield lamination sub-layers can be formed with differing deposition means, materials, and thicknesses in a number of different steps.

It can be appreciated that the tuning of the side shield laminations of a magnetic element to provide flux closure through tuned sub-layers each coupled to a top shield can increase cross-track resolution through minimized generation of cross-track magnetic fields. The ability to tune the shape, material, and thickness of the various side shield sub-layers can additionally provide controlled flux closure while increasing magnetically stability by reducing generation of magnetic charge proximal to the magnetic stack. As such, the present technology allows for the fabrication of a magnetic element capable of operating in larger capacity data storage devices with higher data access accuracy and faster data transfer times.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising a magnetic stack separated from a side shield lamination on an air bearing surface (ABS), the side shield lamination having a plurality of magnetic and non-magnetic sub-layers each coupled to different portions of a top shield, the magnetic and non-magnetic sub-layers having linear sidewalls aligned with a longitudinal axis of the magnetic stack and configured with a shape that forms closed magnetic flux loops with the top shield.

2. The apparatus of claim 1, wherein the magnetic stack is configured as a trilayer read sensor comprising first and second magnetically free layers without a magnetically pinned reference structure.

3. The apparatus of claim 2, wherein a rear bias magnet is positioned adjacent to and separated from the magnetic stack, distal the ABS.

4. The apparatus of claim 1, wherein the non-magnetic sub-layers separate the magnetic sub-layers in the side shield lamination.

5. The apparatus of claim 2, wherein each sub-layer has predetermined thicknesses that are less than a free thickness of the first and second magnetically free layers.

6. A magnetic element comprising a magnetic stack disposed between first and second side shield laminations on an air bearing surface (ABS), each side shield lamination having a plurality of magnetic and non-magnetic sub-layers each coupled to different portions of a top shield, the magnetic and non-magnetic sub-layers having linear sidewalls aligned with a longitudinal axis of the magnetic stack and configured with a shape that forms closed magnetic flux loops with the top shield.

7. The magnetic element of claim 6, wherein at least one sub-layer comprises a transition region defining a varying thickness.

8. The magnetic element of claim 6, wherein a magnetic sub-layer of each side shield lamination forms a continuous thickness sidewall facing the magnetic stack.

9. The magnetic element of claim 8, wherein the continuous sidewall is shaped to match a sidewall of the magnetic stack.

10. The magnetic element of claim 6, wherein each sub-layer has a common shape with a continuous sidewall portion facing the magnetic stack.

11. The magnetic element of claim 10, wherein the continuous sidewall portion of each sub-layer contacts the top shield.

12. The magnetic element of claim 6, wherein each sub-layer is configured with a predetermined thickness and material to provide a balanced magnetic moment.

13. The magnetic element of claim 6, wherein a magnetic sub-layer is formed via a first deposition means and non-magnetic sub-layer is formed via a second deposition means, different from the first deposition means.

14. The magnetic element of claim 6, wherein each sub-layer is configured to direct magnetic flux orthogonal to a magnetization direction of the magnetic stack.

15. The magnetic element of claim 14, wherein each sub-layer is configured to direct magnetic flux parallel and orthogonal to a magnetization direction of the magnetic stack.

16. The magnetic element of claim 15, wherein each sub-layer is configured to direct magnetic flux parallel to the magnetization direction of the magnetic stack distal the magnetic stack and direct magnetic flux orthogonal to the magnetization direction of the magnetic stack proximal the magnetic stack.

17. A transducing head comprising:
a magnetic stack separated from a side shield lamination on an air bearing surface (ABS), the side shield lamination having a plurality of magnetic and non-magnetic sub-layers each coupled to different portions of a top shield with linear sidewalls aligned with a longitudinal axis of the magnetic stack and configured with a shape that forms closed magnetic flux loops with the top shield.

18. The transducing head of claim 17, wherein the top shield comprises a non-magnetic thin film contacting less than all of the plurality of magnetic and non-magnetic sub-layers.

19. The transducing head of claim 18, wherein the non-magnetic thin film continuously extends to contact both the side shield lamination and magnetic stack.

20. The transducing head of claim 18, wherein the non-magnetic thin film contacts a plurality of sub-layers without contacting the magnetic stack.

\* \* \* \* \*